US009921979B2

(12) United States Patent
Tsirkin et al.

(10) Patent No.: US 9,921,979 B2
(45) Date of Patent: Mar. 20, 2018

(54) POSITION DEPENDENT CODE IN VIRTUAL MACHINE FUNCTIONS (71) Applicant: Red Hat Israel, Ltd., Raanana (IL)

(72) Inventors: Michael Tsirkin, Raanana (IL); Paolo Bonzini, Milan (IT)

(73) Assignee: Red Hat Israel, Ltd., Ra'anana (IL)

( * ) Notice: Subject to any disclaimer, the term of this patent is extended or adjusted under 35 U.S.C. 154(b) by 117 days.

(21) Appl. No.: 14/596,359

(22) Filed: Jan. 14, 2015

(65) Prior Publication Data

US 2016/0203088 A1    Jul. 14, 2016

(51) Int. Cl.
*G06F 12/14* (2006.01)
*G06F 12/10* (2016.01)
*G06F 9/455* (2006.01)
*G06F 12/1009* (2016.01)
*G06F 12/109* (2016.01)

(52) U.S. Cl.
CPC ...... *G06F 12/1483* (2013.01); *G06F 9/45558* (2013.01); *G06F 12/109* (2013.01); *G06F 12/1009* (2013.01); G06F 2009/45587 (2013.01); G06F 2212/1052 (2013.01); G06F 2212/656 (2013.01); G06F 2212/657 (2013.01)

(58) Field of Classification Search
CPC .......................... G06F 9/45558; G06F 12/109
See application file for complete search history.

(56) References Cited

U.S. PATENT DOCUMENTS

| 7,124,237 B2 | 10/2006 | Overton et al. |
| 7,299,337 B2 | 11/2007 | Traut et al. |
| 8,799,879 B2 | 8/2014 | Wright et al. |
| 8,875,295 B2 | 10/2014 | Lutas et al. |
| 2008/0133896 A1* | 6/2008 | Keniston ............ G06F 11/3644 712/227 |
| 2011/0154297 A1* | 6/2011 | Singh ................ G06F 11/3471 717/130 |
| 2013/0276057 A1* | 10/2013 | Smith .................... G06F 21/00 726/1 |
| 2014/0082258 A1 | 3/2014 | Ober |
| 2014/0189690 A1 | 7/2014 | Ramakrishnan |
| 2014/0281040 A1 | 9/2014 | Liu |

(Continued)

OTHER PUBLICATIONS

Jun Nakajima, James Tsai, Mesut Ergin, Yang Zhang, Wei Wang, Extending KVM Models Toward High-Performance NFV, Oct. 14, 2014, 27 pages, Intel® Look Inside™, Copyright © 2014 Intel Corporation.

(Continued)

*Primary Examiner* — Ann J Lo
*Assistant Examiner* — Masud Khan
(74) *Attorney, Agent, or Firm* — Haynes and Boone, LLP (57) ABSTRACT

Methods, systems, and computer program products for executing a protected function are provided. A computer-implemented method may include storing a first virtual machine function instruction as the last instruction on the first trampoline page that is executable to configure access privileges according to a trampoline view, storing a page table setup instruction on the second trampoline page, and storing a second virtual machine function instruction as a last instruction on the second trampoline page that is executable to configure access privileges according to a protected view.

20 Claims, 4 Drawing Sheets

(56) References Cited

U.S. PATENT DOCUMENTS

2014/0380009 A1* 12/2014 Lemay ................. G06F 12/145
  711/163
2015/0370590 A1* 12/2015 Tuch ................... G06F 9/45558
  718/1

OTHER PUBLICATIONS

Brandon Heller, Discussions Developers of the SableVM Java VM, http://blog.gmane.org/gmane.comp.java.vm.sablevm.devel/month-20050801, Aug. 2005, 3 pages.

Tim Schattkowsky, Wolfgang Müller, Model-Based Design of Embedded Systems, C-LAB, Paderborn University, 2004.

User: Pancakes/ARM Integrator-CP VMM2, Apr. 24, 2014, 5 pages, http://wiki.osdev.org/User:Pancakes/ARM_Integrator-CP_VMM2.

* cited by examiner

FIG. 1

| Pages 202 | Primary View 216 | Trampoline View 218 | Protected View 220 |
|---|---|---|---|
| Guest Code and Data 204 | Read/Write/Execute | -/-/- | Read/Write/- |
| Virtual Machine Function Page Tables 206 | Read/-/Execute | Read/-/- | Read/Write/- or Read/-/- |
| First Trampoline Page 208 | Read/-/Execute | -/-/- | Read/-/Execute |
| Second Trampoline Page 210 | -/-/- | Read/-/Execute | -/-/- |
| Entry Point Page 212 | -/-/- | Read/-/- | Read/-/Execute |
| Extra Code Pages 214 | -/-/- | Read/-/- | Read/-/Execute |

POSITION DEPENDENT CODE IN VIRTUAL MACHINE FUNCTIONS

BACKGROUND

A virtual machine is software that is executed on hardware to create a virtualization of a physical computer system. Virtual machines may function as self-contained platforms that run their own operating systems and software applications.

A host machine, such as a server computer may concurrently run one or more virtual machines using software that is referred to as a hypervisor. The hypervisor allocates a certain amount of the host's resources, such as the host's underlying physical processors and memory devices, to each of the virtual machines, allowing the virtual machines to transparently access the host's resources.

Each virtual machine may use the allocated resources to execute applications, including operating systems referred to as guest operating systems. Each virtual machine guest operating system may be accessed by one or more local or remote clients to perform computing tasks.

BRIEF SUMMARY

According to an example, a method for secure virtual machine access to one or more protected virtual machine functions includes storing a first virtual machine function instruction as a last instruction on a first trampoline page, the first virtual machine function instruction executable to configure access privileges according to a trampoline view. The method further includes configuring a virtual machine function page table to order a second trampoline page after the first trampoline page, and one or more protected pages after the second trampoline page. The method further includes storing a page table setup instruction on the second trampoline page, the page table setup instruction executable to set up a virtual machine function page table. The method further includes storing a second virtual machine function instruction as a last instruction on the second trampoline page, the second virtual machine function instruction executable to configure access privileges according to a protected view.

According to an example, a non-transitory computer-readable medium for providing a secure transition between pages of a virtual machine, including computer-readable instructions executable by a processor includes a first instruction positioned at the end of a first trampoline page, the first instruction to configure access privileges according to a trampoline view. The medium further includes a second instruction positioned on a second trampoline page, the second instruction to set up a page table. The medium further includes a third instruction positioned at the end of the second trampoline page, the third instruction to configure the access privileges according to a protected view. The medium further includes a fourth instruction located on a protected page, the fourth instruction to perform a protected function.

According to an example, a host system including a hypervisor and a plurality of virtual machines, includes a primary view comprising a first set of access privileges. The system further includes a trampoline view comprising a second set of access privileges. The system further includes a protected view comprising a third set of access privileges. The system further includes a first trampoline page comprising instructions located at the beginning of the first trampoline page that are executed by the processor to jump to a last instruction of the first trampoline page, the last instruction of the first trampoline page to configure the trampoline view as a current view. The system further includes a second trampoline page comprising instructions located at the beginning of the second trampoline page that are to set up a virtual machine function page table, the second trampoline page further comprising instructions to jump to a last instruction of the second trampoline page, the last instruction of the second trampoline page to configure the protected view as the current view. The system further includes a protected page comprising instructions that are executed after executing the last instruction of the second trampoline page.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
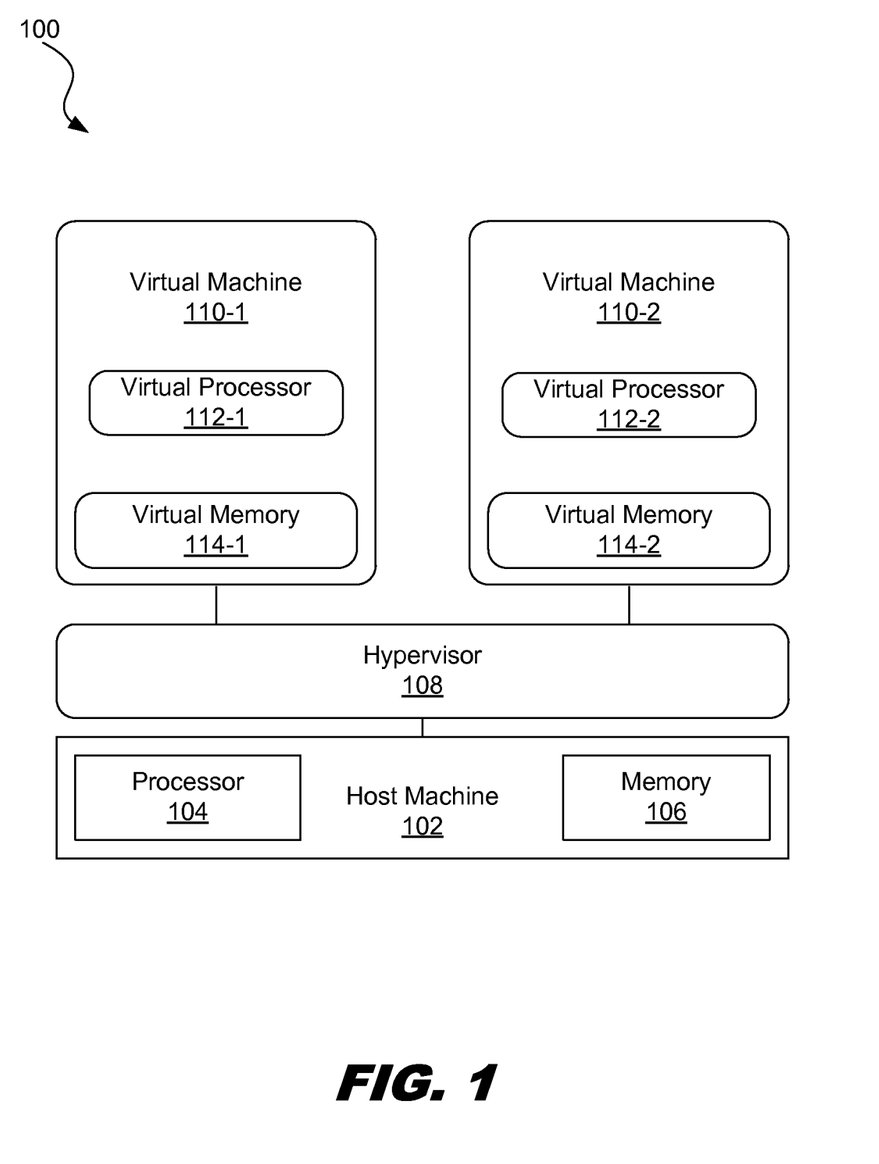
FIG. 1 is a diagram showing an illustrative host system, in accordance with various examples of the present disclosure.

FIG. 1 is a diagram showing an illustrative host system 100. According to the present example, a physical system, such as host machine 102 includes hardware such as processor 104 for executing software (e.g., machine readable instructions) and using or updating data stored in memory 106. Processor 104 may represent one or more processors acting in concert. Memory 106 may be one or more of many different types of memory. Some types of memory, such as solid state drives typically have relatively larger storage volume but relatively slower performance. Other types of memory, such as those used for Random Access Memory (RAM), are optimized for speed and are often referred to as "working memory." The various types of memory may store information in the form of software and data. The software may include an operating system, hypervisor 108 and various other software applications.

The hypervisor 108 supports a first virtual machine 110-1 having a first virtual processor 112-1 and a first virtual memory 114-1. The hypervisor 108 also supports a second virtual machine 110-2 having a second virtual processor 112-2 and a second virtual memory 114-2. Although two virtual machines 110 are illustrated, other examples include fewer than two virtual machines or more than two virtual machines.

In the present example, virtual machines 110 are platforms on which operating systems referred to as guest operating systems run. The guest operating systems may be referred to as "guests." A guest running on the first virtual machine 110-1 may be a different operating system than another guest running on the second virtual machine 110-2. Guests may also be different operating systems than the operating system running on host machine 102.

Hypervisor 108 manages host machine 102 resources and makes them available to one or more guests that may be alternately or concurrently executed by the host machine 102. Hypervisor 108 may manage hardware resources and arbitrates requests of the multiple guests. For example, hypervisor 108 may present a virtual set of CPU, memory, I/O, and disk resources to each guest based on the physical hardware and/or based on a standard and consistent selection of custom hardware. A virtual machine 110 is provided its own address space in memory, its own processor resource allocation, and its own device input/output (I/O) using its own virtual device drivers.

The hardware resources of the host machine 102 are shared among the hypervisor 108 and one or more guests. The hypervisor 108 can map a virtual resource or state (e.g., registers, memory, or files) to resources in the underlying host machine 102. For example, the hypervisor 108 may present a virtual memory 114-1 to virtual machine 110-1 and may also present a virtual memory 114-2 to virtual machine 110-2.

The hypervisor 108 maps the memory locations of virtual memory 114, referred to as virtual memory locations, to physical memory locations of memory 106 using page tables, which may be referred to as virtual machine function page tables. These pages tables may be stored in a virtual memory, such as virtual memory 114-1 in order to be accessible to a virtual machine 110-1. A page table may be a data structure that stores mappings between the virtual addresses of the virtual machine 110 and the physical addresses of memory 106.

Hypervisor 108 provides sets of access privileges, referred to as "views," which define a virtual machine's privileges to the different pages.

Virtual machines may perform protected functions such as accessing memory assigned to other virtual machines by traversing the page tables and views. Functionality pertaining to the views and page tables is further discussed regarding FIG. 2 and FIG. 3.

Figure 2:
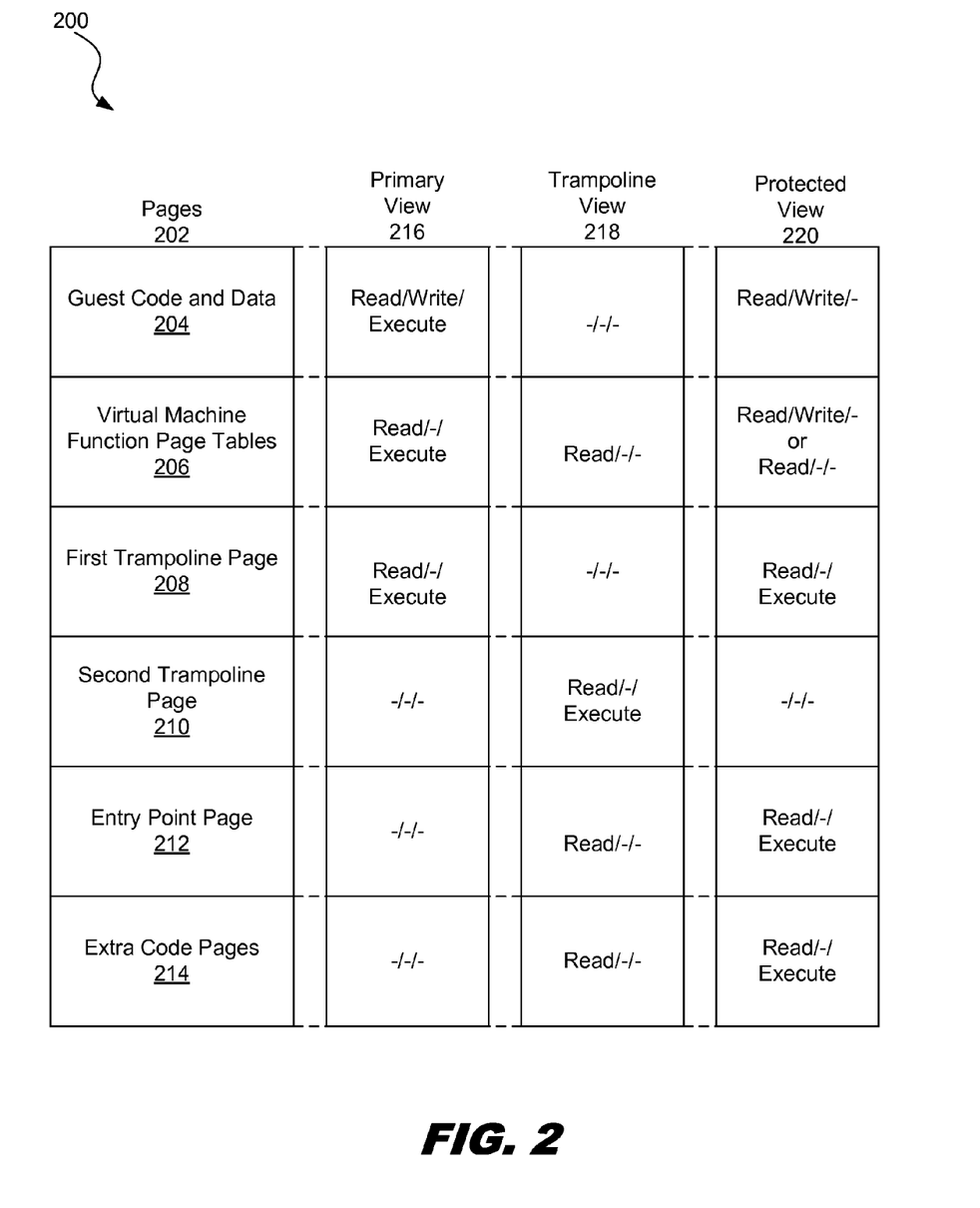
FIG. 2 is a diagram showing an illustrative assignment of page access privileges for each defined view, in accordance with various examples of the present disclosure.

FIG. 2 is a diagram showing an illustrative assignment of page access privileges configured for each defined view. According to the present example a memory includes a plurality of pages 202 that comprise guest code and data pages 204, virtual machine function page tables pages 206, first trampoline page 208, second trampoline page 210, entry point page 212 and extra code pages 214. A page represents a subset of virtual memory that may be used to store data.

The pages 202 are categorized into subsets. Page subsets include guest code and data pages 204, virtual machine function page tables 206, a first trampoline page 208, a second trampoline page 210, an entry point page 212 and extra code pages 214. Each page in a subset of pages has the same access privileges as other pages in its page subset. For example, pages in the guest code and data pages 204 have the access privileges defined for the guest code and data pages. In another example, first trampoline page 208 and second trampoline page 210 are in different page subsets and therefore have separately defined access privileges.

Guest code and data pages 204 store software executed by the guest operating system on the virtual machine, such as software installed by users of the guest operating system.

The virtual machine function page tables 206 store page tables that a guest accesses in order to determine locations of the pages 202 in order to switch between page subsets and pages within the page subsets. The virtual machine function page tables 206 order the pages such that following execution of the last instruction on the first trampoline page 208, the first instruction on the second trampoline page 210 is executed. The entry point page 212 is configured to be executed following execution of the second trampoline page 210. Following execution of the last instruction on the second trampoline page 210, the first instruction on the entry point page 215 is executed. Extra code pages 214 may be configured to be executed following the execution of the last instruction on the entry point page 212.

While in the primary view 216, a guest has read and execute access to the virtual machine function page tables. Accordingly, the guest has access privileges to read addresses of pages identified in the page tables. In some examples, a page table mapping outputs an address of a page that the guest is attempting to locate, the address being stored in a data structure. Some examples of data structures that may be used to store the address include a register, a pointer, a queue and a stack. The guest may use the address by loading the address into a register, and perform an execute operation of the instruction stored at that address stored in the register.

The first trampoline page 208 and the second trampoline page 210 include instructions to secure the computing environment prior to executing a virtual machine function to change the view. The virtual machine function may be referred to as VMFUNC. In some examples, the virtual machine function is configured to be executed only from the first trampoline page 208 and the second trampoline page 210. Accordingly, the trampoline pages are configured to protect the computing environment by structuring the instructions in the pages in a certain manner. The virtual machine function stored on the first trampoline page 208 is an instruction to change the view to the trampoline view 218. The virtual machine function stored on the second trampoline page 210 is an instruction to change the view to the protected view 220.

In some examples, a jump instruction is stored in the first trampoline page 208 and the second trampoline page 210 at or near the start of the page. The placement of the jump instruction allows for instructions in the middle of a page to be skipped. In some examples, the jump instruction is executed in order to skip to the last instruction on the page.

In the present examples, a virtual machine function instruction is stored at the end of the first trampoline page 208 and the second trampoline page 210, such that execution following the change of the view continues onto the next page. By placing the virtual machine function instruction at the end of the page, the next instruction is loaded from a different page. Therefore, the page executing the virtual machine function instruction is inaccessible from the changed view, and the next page is inaccessible from the original view. After executing the instruction to change the view, the next instruction executed is the instruction placed in the page following the particular trampoline page. The placement of the virtual machine function instruction at the end of the page avoids execution of instructions on the page using an unintended view.

After the view has been changed, the second trampoline page 210 performs a page table initialization, such as a setting up the virtual machine function page tables 206. The setup instructions for the virtual machine function page tables 206 may be stored at or near the start of the second trampoline page 210, prior to the jump instruction. The virtual machine function page tables 206 are set up prior to the guest entering the entry point page 212 and the extra code pages 214. In some examples, the set up of the virtual machine function page tables 206 is performed in order to prevent improperly configured virtual machine function page tables from loading an undesirable page.

The entry point page 212 and the extra code pages 214 are referred to as "protected pages." References to the protected pages may refer to either the entry point page 212 or the extra code page 214. The pages are distinguished in that the entry point page 212 is the first protected page, which is accessed following the execution of a view change instruction in the second trampoline page 210.

In the present example, the entry point page 212 and the extra code pages 214 include instructions to perform protected functions to which a guest would not have access privileges to execute in the primary view 216 or the trampoline view 218. In some examples, the protected functions may include instructions that may be executed to write to the memory of another virtual machine that is being executed by the hypervisor.

The extra code pages 214 are available for any additional data that does not fit on the entry point page 212. The extra code pages 214 may include additional instructions that there may not be storage space for in the entry point page 212. Accordingly, following execution of instructions in the entry point page 212, instructions may be executed from the extra code pages 214.

In the present example, the guest does not have read, write or execute access privileges to the protected pages in the primary view 216. Therefore, if a guest is to execute instructions on the protected pages, the guest would enter the first trampoline page 208 in order to execute an instruction to change the view to the trampoline view, execute instructions on the second trampoline page 210 to secure the environment, and execute an instruction on the second trampoline page 210 to change the view to the protected view 220. Once in the protected view 220, the guest has execute access privileges to instructions in the protected pages 212 and 214.

In the present example, access to the virtual machine function that changes the views is restricted such that the virtual machine function is executed from the first trampoline page 208 and the second trampoline page 210, but not the guest code and data pages 204, the virtual machine function page tables 206, the entry point page 212 or the extra code pages 214. A guest that attempts to execute a virtual machine function to change the view, in a page other than a trampoline page, may result in an exit from the virtual machine or an error. Accordingly, to access the protected functions, the guest enters the trampoline pages in order to execute the virtual machine function to change the view.

In the present example, there are three defined views, which are primary view 216, trampoline view 218 and protected view 220.

In the present example, a guest defaults to primary view 216. The trampoline view 218 is used for transitioning from primary view 216 to protected view 220. Accordingly, guest operations using the trampoline view 218 may be ephemeral in nature. Protected view 220 is used for executing protected functions. In some examples, these instructions include writing to the guest code and data pages of another virtual machine.

Each view provides the access privileges for the page subsets. For example, the access privileges for the guest code and data pages 204 are read, write and execute (i.e., full access) while the guest is configured to use primary view 216. Read privileges allow the guest to read data on the pages. Write privileges allow the guest to remove, add, or modify to data on the pages. Execute privileges allow the guest to execute instructions that are written on the pages.

While in the primary view 216, the guest has read and execute privileges to the virtual machine function page tables, which allows the guest to swap to another page such as the first trampoline page 208.

When the guest changes to the trampoline view 218, the guest's access privileges for the guest code and data pages 204 is set to no access (i.e., no read access, no write access and no execute access), and the guest's access privileges for the entry point page 212 and extra code pages 214 are set to read access. Removing access privileges to the guest code and data pages 204 while in the trampoline view 218 provides a security measure to prevent a guest from executing potentially malicious instructions that a guest may have stored in the guest code and data pages 204.

When the guest changes to protected view 220, such as by executing the virtual machine function instructions stored on the second trampoline page 210, the guest's access privileges for the guest code and data pages 204 is set to read and write access (i.e., there is read and write access but no execute access). While in protected view 220, the guest has read and execute access to the entry point page 212 and extra code pages 214. These access privileges allow for executing protected virtual machine functions stored in the entry point page 212 and extra code pages 214. In some examples, these protected functions are used to access hypervisor data or data of another virtual machine.

Figure 3:
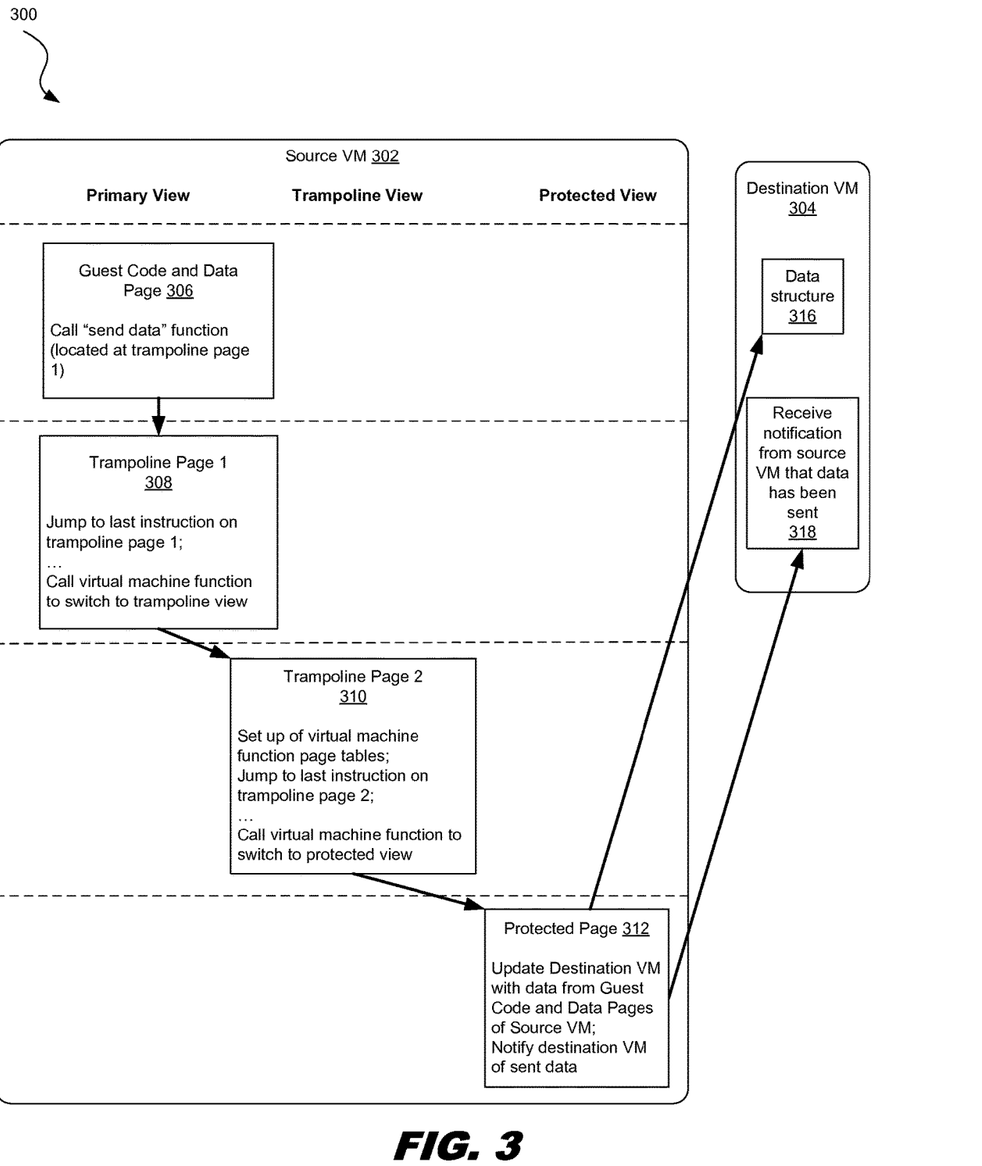
FIG. 3 is a flowchart showing an illustrative secure execution of a protected virtual machine function, in accordance with various examples of the present disclosure.

An example of a method for performing a protected function by traversing views and pages is described regarding FIG. 3.

FIG. 3 is a flowchart showing an illustrative secure execution of a protected virtual machine function. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

The method 300 allows a source virtual machine 302 to perform a protected virtual machine function. In the illustrated example, the protected virtual machine function is sending data from the source virtual machine 302 to a destination virtual machine 304, where both virtual machines are run by a hypervisor executing on a host.

At block 306, guest code and data pages include an instruction to call a function to send data to the destination virtual machine. In some examples, the send data function is a function to send one or more packets of data. In the present example, the guest is operating in the primary view, and therefore has read, write and execute access to the guest code and data pages. This read, write and execute access allows the guest to prepare data for sending, such as by writing the data to data structures in the guest code and data pages, and well as execute the call of the send data function, the function call being stored in the guest code and data pages.

In the present example, the send data function is located at the start of trampoline page 1. Therefore, the call of the function begins execution of the send data function instructions at the start of trampoline page 1.

At block 308, the instructions include any additional preparations to send the data. The instructions include an instruction to jump to the last instruction of trampoline page 1. In some examples, the instruction at the end of trampoline page 1 is three bytes in length. In these examples, the instruction will start three bytes prior to the end of the page, such that the instruction is the last instruction on the page. The jump to the last instruction of the page provides that, after the last instruction of trampoline page 1 is executed, then execution will continue on trampoline page 2.

In the present example, the last instruction of trampoline page 1 is a virtual machine function that is executed to change the view to the trampoline view. The trampoline view provides no access privileges to trampoline page 1, therefore enforcing no further instructions being executed on trampoline page 1. While in the trampoline view, the source virtual machine gains access permissions of read and execute for trampoline page 2. Additionally, the trampoline view is configured with no access privileges to trampoline page 1. Next, since the instruction to change the view to the trampoline view was the last instruction on the page, execution continues on the next page, which is trampoline page 2.

By removing access privileges to trampoline page 1 and placing the location of the instruction to change to the trampoline view at the end of trampoline page 1, risk is mitigated that any additional instructions could be executed on trampoline page 1.

At block 310, execution of trampoline page 2 begins by executing instructions at the start of the page to set up virtual machine function page tables. The set up of the virtual machine function page tables mitigates the risk of a user accessing pages using unauthorized access privileges.

In some examples the set up includes enforcing use of virtual machine function page tables located at a location specified by the hypervisor. In some examples this set up is performed by loading the virtual machine function page tables address into a register. In some examples, the set up includes a comparison of the register with the address of the virtual machine function page table address to provide that the virtual machine function page table address is used for the protected instructions.

Some examples may backup the address currently identified as the virtual machine function page tables address prior to enforcing the use of a specified address for the virtual machine function page tables. Backing up the address allows the address to be restored following access of the protected pages. Backing up the currently identified address also allows the protected page to access virtual machine memory by "walking" the virtual machine function page tables. In some examples, the set up instructions may be:

```
MOV EAX, CR3;    //backup the CR3 register
MOV EBX, [address of virtual machine function page tables]; //load
virtual machine function page tables address in a register
MOV CR3, EBX;    //enforce use of the virtual machine function page
                 tables address.
```

In some examples, the virtual machine function tables address may be loaded into a register without first performing the backup instruction. In some examples, the set up instructions may be:

```
MOV EBX, [address of virtual machine function page tables]; //load
virtual machine function page tables address in a register
MOV CR3, EBX;    //enforce use of the virtual machine function page
                 tables address.
```

In some examples the following instructions may be used to load the virtual machine function page tables address as an expected address and compare the address being used with the expected address. In some examples, the set up instructions may be:

```
MOV EAX, CR3;    //save actual CR3
MOV EBX, [address of virtual machine function page tables]; //load
virtual machine function page tables address in a register
CMP EAX, EBX;    //compare address currently being used as the virtual
machine function page tables address with the expected virtual machine
function page tables address.
```

A successful comparison determines that the virtual machine function page tables are being accessed from the virtual machine function page tables as specified by the hypervisor. A failure of the comparison may indicate that the guest has modified the pointer to the virtual machine function page tables to point to another location, such as the guest code and data pages. Since the guest has read, write and execute access to the guest code and data pages while configured with the primary view, accessing the virtual machine function page tables from the guest code and data pages would allow the guest complete control over the virtual machine function page tables. In some examples, in order to prevent malicious activity, failure of the comparison may result in a shutdown of the virtual machine, without entering the protected view. In some examples, failure of the comparison may result in a virtual machine exit.

In some examples, the CR3 value used may be configured with a dedicated PCID to reduce the overhead of TLB flushes.

In some examples, the hypervisor may provide a hypercall to be executed by the guest as a prerequisite for using the protected virtual machine function, such that the hypervisor may determine that the virtual machine function page tables are properly configured for use in the secure execution of a protected virtual machine function, and marking the virtual machine function page tables read-only upon successful verification that the virtual machine function page tables are properly configured.

In some examples, the hypervisor may provide a hypercall to be executed by the guest as a prerequisite for using the protected virtual machine function, such that the hypervisor may write the virtual machine function page tables and mark the virtual machine function page tables read-only.

In the present example, one or more of the above setup tasks are used to enforce security of the environment prior to entering the protected view. If the one or more specified setup tasks are completed, then an instruction is executed to jump to the last instruction of trampoline page 2. In some examples, the instruction at the end of trampoline page 2 is three bytes in length. In these examples, the instruction will start three bytes prior to the end of the page such that the instruction is the last instruction on the trampoline page 1. The last instruction of trampoline page 2 changes the view to the protected view. Once in the protected view, the source virtual machine 302 gains permissions to read and execute instructions stored in the entry point page and the extra code pages. The protected view sets the access privileges to the trampoline page 2 to no access.

By removing access privileges to trampoline page 2 and placing the location of the instruction to change to the protected view at the end of trampoline page 2, risk is mitigated that any additional instructions could be executed on trampoline page 2.

Next, since the instruction to change the view to the protected view was the last instruction on the page, execution continues on the next page, which is the entry point page.

The entry point page contains instructions that are configured to be executed to perform the protected virtual machine functions. In the illustrated example, at block 312, the protected virtual machine function updates a data structure 316 in the memory of a destination virtual machine 304 and at block 318 notifies the destination virtual machine 304 that the data structure 316 has been updated. A notification may be setting a flag in a memory location of a destination virtual machine 304. In the present example, the data that is used to update data structure 316 may be read from the guest code and data pages.

In the present example, once the execution of the protected virtual machine function is completed, execution returns back to trampoline page 1 immediately following the jump instruction on trampoline page 1. The next instruction executed on trampoline page 1 changes the view from the protected view to the primary view. The next instruction executed on the trampoline page 1 returns back from trampoline page 1 to the instruction following the function call executed on the guest code and data pages.

Accordingly, the guest is able to execute a protected function. Following the execution of the protected function, the guest is placed back into the guest code and data pages, with the primary view restored.

Figure 4:
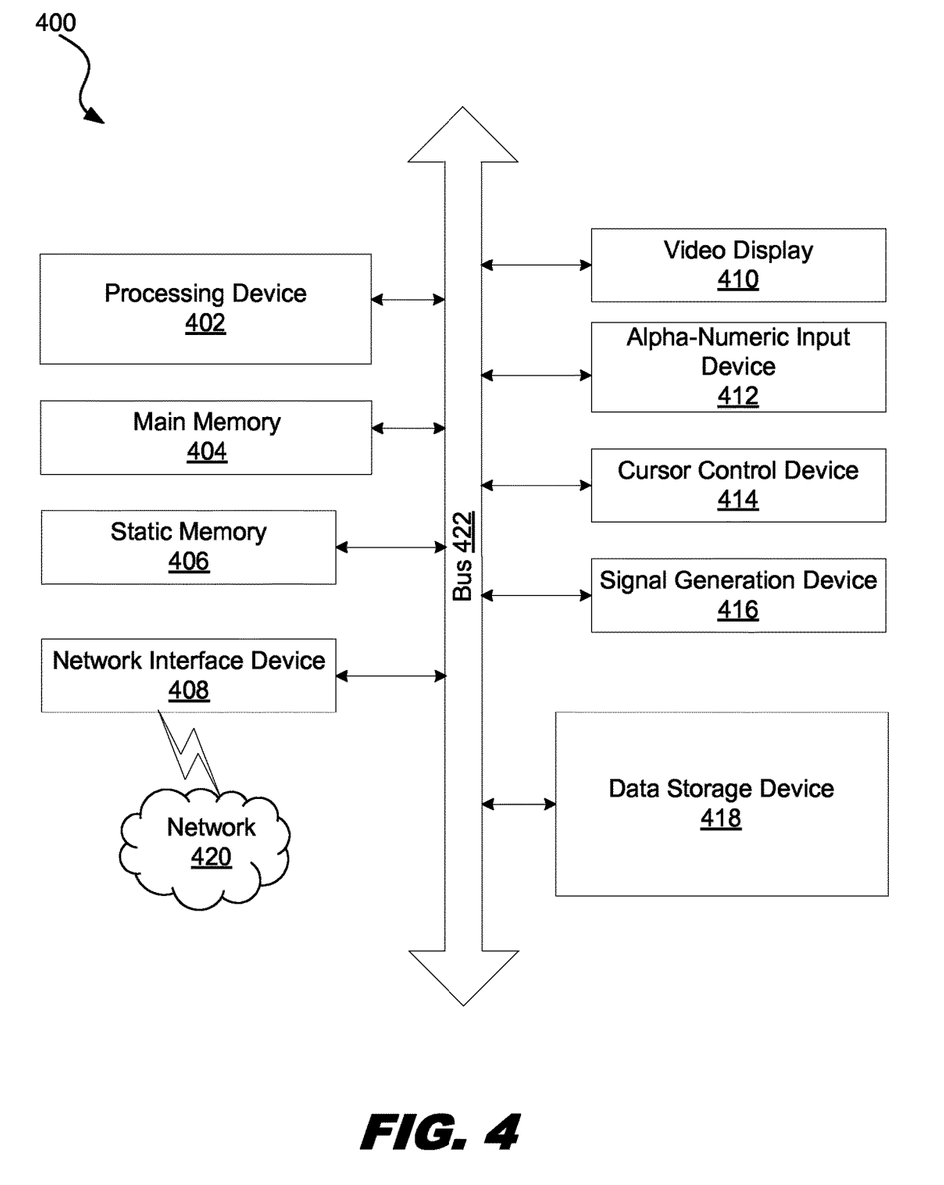
FIG. 4 is a block diagram illustrating a computer system that may perform one or more of the operations described herein, in accordance with various examples of the present disclosure.

FIG. 4 illustrates a diagram of a machine in the exemplary form of a computer system 400 within which a set of instructions, for causing the machine to perform any one or more of the methodologies discussed herein, may be executed. The machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the present example, computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 422.

Processor 402 represents one or more general-purpose processing devices such as a microprocessor, central processing unit, or the like. More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium that stores one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for secure virtual machine access to one or more protected virtual machine functions comprising:
    storing a first virtual machine function instruction as a last instruction on a first trampoline page, the first virtual machine function instruction executable to configure access privileges according to a trampoline view;
    configuring a virtual machine function page table to order a second trampoline page after the first trampoline page, and one or more protected pages after the second trampoline page;
    storing a virtual machine function page table setup instruction on the second trampoline page; and
    storing a second virtual machine function instruction as a last instruction on the second trampoline page, the second virtual machine function instruction executable to configure access privileges according to a protected view.

2. The method of claim 1 further comprising:
    storing a first jump instruction on the first trampoline page, the first jump instruction executable to skip to the last instruction on the first trampoline page; and
    storing a second jump instruction on the second trampoline page, the second jump instruction executable to skip to the last instruction on the second trampoline page.

3. The method of claim 1 wherein the virtual machine function page table setup instruction is executable to:
    compare a stored address of the virtual machine function page table to an expected address.

4. The method of claim 1 wherein the virtual machine function page table setup instruction is executable to:
    backup a stored address of the virtual machine function page table.

5. The method of claim 1 wherein the virtual machine function page table setup instruction is executable to:
    modify a stored address of the virtual machine function page table to an expected address.

6. The method of claim 1 wherein the first trampoline page is a single page.

7. The method of claim 1 wherein the trampoline view configures access privileges to allow execution of instructions stored on the second trampoline page, and wherein the trampoline view configures access privileges to prohibit execution of instructions on pages other than the second trampoline page.

8. The method of claim 1 wherein the one or more protected pages store instructions corresponding to a protected function.

9. The method of claim 1 wherein the protected view configures access privileges to allow execution of instructions stored on the one or more protected pages and the first trampoline page, and wherein the protected view is configured to prohibit execution of instructions that are stored on at least one page other than the one or more protected pages or the first trampoline page.

10. A non-transitory computer-readable medium for providing a secure transition between pages of a virtual machine, including computer-readable instructions executable by a processor comprising:
    a first instruction positioned at the end of a first trampoline page, the first instruction to configure access privileges according to a trampoline view,
    a second instruction positioned on a second trampoline page, the second instruction to set up a page table;
    a third instruction positioned at the end of the second trampoline page, the third instruction to configure the access privileges according to a protected view; and
    a fourth instruction located on a protected page, the fourth instruction to perform a protected function.

11. The non-transitory computer-readable medium of claim 10 wherein the set up of the page table comprises:
    comparing a stored address of the page table to an expected address.

12. The non-transitory computer-readable medium of claim 10 wherein the set up of the page table comprises:
    backing up a stored address of the page table; and
    modifying the stored address of the page table to an expected address.

13. The non-transitory computer-readable medium of claim 10 wherein the first trampoline page comprises a single page and the second trampoline page comprises a single page.

14. The non-transitory computer-readable medium of claim 10 wherein the access privileges according to the trampoline view are configured to allow execution of instructions stored on the second trampoline page and prohibit execution of instructions on pages other than the second trampoline page.

15. The non-transitory computer-readable medium of claim 10 wherein the access privileges according to the protected view are configured to: (i) allow execution of instructions stored on the protected page and the first trampoline page and (ii) prohibit execution of instructions that are stored on pages other than the protected page or the first trampoline page.

16. A host system including a hypervisor and a plurality of virtual machines, comprising:
    at least one processor in communication with a memory;
    a primary view comprising a first set of access privileges;

a trampoline view comprising a second set of access privileges;
a protected view comprising a third set of access privileges;
a first trampoline page comprising at an instruction to jump to a last instruction of the first trampoline page, the last instruction of the first trampoline page to configure the trampoline view as a current view;
a second trampoline page comprising at least one instruction to set up a virtual machine function page table, the second trampoline page further comprising an instruction to jump to a last instruction of the second trampoline page, the last instruction of the second trampoline page to configure the protected view as the current view; and
a protected page comprising an instruction that is executed by the processor after executing the last instruction of the second trampoline page.

17. The host system of claim 16 wherein the set up of the virtual machine function page table comprises:
   comparing a configured address of the virtual machine function page table to an expected address.

18. The host system of claim 16 wherein the set up of the virtual machine function page table comprises:
   backing up a configured address of the virtual machine function page table; and
   modifying the configured address of the virtual machine function page table to an expected address.

19. The host system of claim 16 wherein the trampoline view provides execute access privileges to instructions located on the second trampoline page.

20. The host system of claim 16 wherein the protected view provides execute access privileges to instructions located on the protected page and the first trampoline page.

* * * * *